US011521095B2

(12) United States Patent
Wang et al.

(10) Patent No.: US 11,521,095 B2
(45) Date of Patent: Dec. 6, 2022

(54) METHODS AND SYSTEMS FOR CNN NETWORK ADAPTION AND OBJECT ONLINE TRACKING

(71) Applicant: BEIJING SENSETIME TECHNOLOGY DEVELOPMENT CO., LTD, Beijing (CN)

(72) Inventors: Xiaogang Wang, Hong Kong (CN); Lijun Wang, Liaoning (CN); Wanli Ouyang, Hong Kong (CN); Huchuan Lu, Liaoning (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 722 days.

(21) Appl. No.: 16/052,500

(22) Filed: Aug. 1, 2018

(65) Prior Publication Data

US 2018/0341872 A1    Nov. 29, 2018

Related U.S. Application Data

(63) Continuation of application No. PCT/CN2016/073184, filed on Feb. 2, 2016.

(51) Int. Cl.
*G06N 3/08* (2006.01)
*G06K 9/62* (2022.01)
(Continued)

(52) U.S. Cl.
CPC ........... *G06N 5/046* (2013.01); *G06K 9/6262* (2013.01); *G06K 9/6274* (2013.01);
(Continued)

(58) Field of Classification Search
CPC ... G06T 7/11; G06T 7/20; G06T 2207/20081; G06T 2207/20084; G06K 9/00664;
(Continued)

(56) References Cited

U.S. PATENT DOCUMENTS 8,582,807 B2    11/2013  Yang et al.
9,836,853 B1 *  12/2017  Medioni .................. G06T 7/246
(Continued)

FOREIGN PATENT DOCUMENTS

CN    102054170 A       5/2011
CN    111967305 A   *  11/2020

OTHER PUBLICATIONS

Matej Kristan et al. "The Visual Object Tracking VOT2015 Challenge Results". Proceedings of the IEEE International Conference on Computer Vision (ICCV) Workshops, Dec. 2015, pp. 1-23 (Year: 2015).*

(Continued)

*Primary Examiner* — Claire X Wang
*Assistant Examiner* — Stephen M Brinich
(74) *Attorney, Agent, or Firm* — Reising Ethington P.C.

(57) ABSTRACT

Disclosed are methods, apparatuses and systems for CNN network adaption and object online tracking. The CNN network adaption method comprises: transforming a first feature map into a plurality of sub-feature maps, wherein the first feature map is generated by the pre-trained CNN according to a frame of the target video; convolving each of the sub-feature maps with one of a plurality of adaptive convolution kernels, respectively, to output a plurality of second feature maps with improved adaptability; training, frame by frame, the adaptive convolution kernels.

18 Claims, 7 Drawing Sheets

(51) Int. Cl.
*G06K 9/46* (2006.01)
*G06T 7/11* (2017.01)
*G06T 7/73* (2017.01)
*G06T 7/20* (2017.01)
*G06N 5/04* (2006.01)
*G06N 3/04* (2006.01)
*G06V 10/44* (2022.01)
*G06V 20/10* (2022.01)

(52) U.S. Cl.
CPC .......... *G06N 3/0454* (2013.01); *G06N 3/084* (2013.01); *G06T 7/11* (2017.01); *G06T 7/20* (2013.01); *G06T 7/73* (2017.01); *G06V 10/454* (2022.01); *G06V 20/10* (2022.01); *G06T 2207/20081* (2013.01)

(58) Field of Classification Search
CPC .. G06K 9/4628; G06K 9/4633; G06K 9/6262; G06K 9/6274; G06V 10/454; G06V 10/443; G06V 10/457; G06V 10/82; G06V 20/10
USPC .......... 382/155–159, 100, 103; 706/2, 6, 15; 700/48
See application file for complete search history.

(56) References Cited

U.S. PATENT DOCUMENTS 10,402,978 B1* 9/2019 Kim ...................... G06V 10/454
10,679,351 B2* 6/2020 El-Khamy ................ G06T 7/70
2017/0132472 A1* 5/2017 Tao .......................... G06N 3/08
2017/0186176 A1* 6/2017 Paluri .................. G06K 9/4628
2017/0262705 A1* 9/2017 Li ........................ G06N 3/0445
2018/0211099 A1* 7/2018 Ranjan ............... G06K 9/00248
2019/0156144 A1* 5/2019 Li ........................ G06K 9/6257

OTHER PUBLICATIONS

K. Chen and W. Tao, "Once for All: A Two-Flow Convolutional Neural Network for Visual Tracking," in IEEE Transactions on Circuits and Systems for Video Technology, vol. 28, No. 12, pp. 3377-3386, Dec. 2018, doi: 10.1109/TCSVT.2017.2757061. (Year: 2018).*
Wenlai Zhao et al., "F-CNN: An FPGA-based framework for training Convolutional Neural Networks," 2016 IEEE 27th International Conference on Application-specific Systems, Architectures and Processors (ASAP), London, UK, 2016, pp. 107-114, doi: 10.1109/ASAP.2016.7760779. (Year: 2016).*
Yang, Linjie & Liu, Jianzhuang & Tang, Xiaoou. (2014). Object Detection and Viewpoint Estimation with Auto-masking Neural Network. 441-455. 10.1007/978-3-319-10578-9_29. (Year: 2014).*
Li et al., "Research on Visual Tracking Algorithm Based on Deep Feature Expression and Learning", Journal of Electronics and Information Technology, vol. 37 No. 9, Sep. 30, 2015, 7 pages.
Wang et al., "Visual Tracking with Fully Convolutional Networks", IEEE International Conference on Computer Vision, Dec. 31, 2015, pp. 3119-3127.
International Search Report for International application No. PCT/CN2016/073184, dated Oct. 20, 2016, 3 pages.
Written Opinion for International application No. PCT/CN2016/073184, dated Oct. 20, 2016, 3 pages.

* cited by examiner

METHODS AND SYSTEMS FOR CNN NETWORK ADAPTION AND OBJECT ONLINE TRACKING

CROSS REFERENCE TO RELATED APPLICATION

This application is a continuation of PCT/CN2016/073184, filed on Feb. 2, 2016 and entitled "METHODS AND SYSTEMS FOR CNN NETWORK ADAPTION AND OBJECT ONLINE TRACKING", the entire disclosure of which is hereby incorporated by reference.

TECHNICAL FIELD

The disclosures relate to methods, apparatuses and systems for Convolutional Neural Network (CNN) network adaption and object online tracking.

BACKGROUND

Visual tracking is a fundamental problem in computer vision that has been received a rapidly growing attention. For a model-free object tracking problem, a category agnostic target is indicated by a bounding box in the first frame, and the tracker aims at locating the target in each of the following frames. Due to significant target appearance changes caused by abrupt motion, deformation, occlusion and illumination variation, visual tracking is still a challenging problem. Prior approaches rely on hand-crafted features to describe the target and have addressed the above challenging factors to a certain extend.

Recently, deep CNNs trained on large scale image classification data sets have demonstrated great success. These semantic representations discovered by the learning process are shown to be very effective at distinguishing objects of various categories. However, supervised training of deep CNNs with millions of parameters entails a large number of annotated training samples. To apply deep CNNs for tasks with a limited amount of training samples, previous approaches adopt a transfer learning method by first pre-training a deep CNN on a source task with a large scale training data set and then fine-tuning the learned feature on the target task. Due to the good generalization capability of CNN features across different data sets, this transfer learning approach is effective and has shown state-of-the-art performance in many applications.

However, for online visual tracking, the lack of training samples becomes even more severe, since the only training sample with ground truth label is provided in the first frame, and the tracking results used for updating the tracker are also obtained in a sequential manner. Thus, directly fine-tuning a pre-trained deep CNN online is prone to over-fitting, which will degrade the tracker and gradually leads to tracking drift

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In order to address, at least partially, one of the above issues, a CNN network adaption method is proposed for adapting a pre-trained CNN to a target video, in one aspect of the present application. The method comprises: transforming a first feature map into a plurality of sub-feature maps, wherein the first feature map is generated by the pre-trained CNN according to a frame of the target video; convolving each of the sub-feature maps with one of a plurality of adaptive convolution kernels, respectively, to output a plurality of second feature maps with improved adaptability; and training, frame by frame, the adaptive convolution kernels.

In one embodiment of the present application, the transforming and the convolving are implemented in an adaptive CNN comprising: a first convolution layer, linked to the pre-trained CNN and configured to transform the first feature map into the plurality of sub-feature maps; and a second convolution layer, linked to the first convolution layer and configured to convolve each of the sub-feature maps with one of the adaptive convolution kernels, respectively.

In one embodiment of the present application, the training comprises: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converge, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively; and optimizing, according to a subsequent frame of the target video, the parameters grouped in the candidate set.

In one embodiment of the present application, the optimizing comprises: feeding the second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels; and if any of the second training errors is higher than a threshold, back-propagating the second training errors through the pre-trained CNN and the adaptive CNN to further refine the parameters in the candidate set and transferring at least one of the further refined parameters to the ensemble set.

In one embodiment of the present application, each of the adaptive convolution kernels is trained under a different loss criterion.

In one embodiment of the present application, the method further comprises further reducing, by a mask layer, a correlation among the sub-feature maps, wherein the mask layer is linked to the second convolution layer of the adaptive CNN.

In one embodiment of the present application, the mask layer comprises a plurality of binary masks, each of which is convolved with one of the sub-feature maps and has a same spatial size with the convolved sub-feature map.

In another aspect, a method is proposed for an object online tracking, comprising: determining a region of interest (ROI) in a first frame of a target video; feeding the determined ROI forward through a pre-trained CNN to extract an initial feature map thereof; initializing, with the initial feature map, an adaptive CNN used for detecting a location of the object and a scale estimation network used for defining a scale of the object; predicting, with the initialized adaptive CNN, a second location of the object in a second frame of the target video, wherein the second frame is subsequent to the first frame; estimating, with the initialized scale estimation network, a second scale of the object in the second frame of the target video; updating, with optimized network parameters acquired in the predicting and the estimating, the adaptive CNN and the scale estimation network, respectively; predicting, with the updated adaptive CNN, a third location of the object in a third frame of the target video, wherein the third frame is subsequent to the second frame; and estimating, with the updated scale estimation network, a third scale of the object in the third frame of the target video.

In one embodiment of the present application, the adaptive CNN comprises: a first convolution layer, linked to the pre-trained CNN and configured to transform a first feature map into a plurality of sub-feature maps, wherein the first feature map is generated by the pre-trained CNN according to any frame of the target video; and a second convolution layer, linked to the first convolution layer and configured to convolve each of the sub-feature maps with one of a plurality of adaptive convolution kernels, respectively, to output a plurality of second feature maps with improved adaptability.

In one embodiment of the present application, the adaptive CNN is initialized by: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converges, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively.

In one embodiment of the present application, the adaptive CNN is updated by: feeding a second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels, respectively; and if any of the second training errors is higher than a threshold, back-propagating the second training errors through the pre-trained CNN and the adaptive CNN to further refine the parameters in the candidate set and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In one embodiment of the present application, the location of the object is predicted by a heat map generated by the adaptive CNN, wherein a location with a maximum value is predicted to be the location of the object and the maximum value is sampled as a confidence.

In one embodiment of the present application, the updating is performed only if the confidence is higher than a pre-defined threshold.

In one embodiment of the present application, the ROI is centered at an object to be tracked.

In another aspect, a system is proposed for adapting a pre-trained CNN to a target video, comprising: a memory that stores executable components; and a processor electrically coupled to the memory to execute the executable components. The executable components are executed for: transforming a first feature map into a plurality of sub-feature maps, wherein the first feature map is generated by the pre-trained CNN according to a frame of the target video; convolving each of the sub-feature maps with one of a plurality of adaptive convolution kernels, respectively, to output a plurality of second feature maps with improved adaptability; training, frame by frame, the adaptive convolution kernels.

In one embodiment of the present application, the executable components comprises an adaptive CNN comprising: a first convolution layer, linked to the pre-trained CNN and configured to transform the first feature map into the plurality of sub-feature maps; and a second convolution layer, linked to the first convolution layer and configured to convolve each of the sub-feature maps with one of the adaptive convolution kernels, respectively.

In one embodiment of the present application, the training comprises: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converge, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively; and optimizing, according to a subsequent frame of the target video, the parameters grouped in the candidate set.

In one embodiment of the present application, the optimizing comprises: feeding a second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels; and if any of the second training errors is higher than a threshold, back-propagating the second training errors through the pre-trained CNN and the adaptive CNN to further refine the parameters in the candidate set; and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In another aspect, a system is proposed for an object online tracking, comprising: a memory that stores executable components; and a processor electrically coupled to the memory to execute the executable components. The executable components are executed for: determining a region of interest (ROI) in a first frame of a target video; feeding the determined ROI forward through a pre-trained CNN to extract an initial feature map thereof; initializing, with the initial feature map, an adaptive CNN used for detecting a location of the object and a scale estimation network used for defining a scale of the object; predicting, with the initialized adaptive CNN, a second location of the object in a second frame of the target video, wherein the second frame is subsequent to the first frame; estimating, with the initialized scale estimation network, a second scale of the object in the second frame of the target video; updating, with optimized network parameters acquired in the predicting and the estimating, the adaptive CNN and the scale estimation network, respectively; predicting, with the updated adaptive CNN, a third location of the object in a third frame of the target video, wherein the third frame is subsequent to the second frame; and estimating, with the updated scale estimation network, a third scale of the object in the third frame of the target video.

In one embodiment of the present application, the adaptive CNN comprises: a first convolution layer, linked to the pre-trained CNN and configured to transform a first feature map into a plurality of sub-feature maps, wherein the first feature map is generated by the pre-trained CNN according to any frame of the target video; and a second convolution layer, linked to the first convolution layer and configured to convolve each of the sub-feature maps with one of a plurality of adaptive convolution kernels, respectively, to output a plurality of second feature maps with improved adaptability.

In one embodiment of the present application, the adaptive CNN is initialized by: feeding a first training sample forward through the pre-trained CNN and the adaptive CNN to generate a first output image, wherein the first training sample is obtained according to a first frame of the target video; comparing the first output image with a first ground truth derived from the first frame to obtain a plurality of first training errors for the plurality of adaptive convolution kernels, respectively; back-propagating repeatedly the first training errors through the pre-trained CNN and the adaptive CNN to train the adaptive convolution kernels until the first training errors converges, wherein a plurality of parameters are obtained for trained adaptive convolution kernels, respectively; grouping a parameter of the obtained parameters, which has a smallest first training error, and a rest of the obtained parameters into an ensemble set and a candidate set, respectively.

In one embodiment of the present application, the adaptive CNN is updated by: feeding the second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels, respectively; and if any of the second training errors is higher than a threshold, back-propagating the second training errors through the pre-trained CNN and the adaptive CNN to further refine the parameters in the candidate set; and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In one embodiment of the present application, the location of the object is predicted by a heat map generated by the adaptive CNN, wherein a location with a maximum value is predicted to be the location of the object and the maximum value is sampled as a confidence.

In one embodiment of the present application, the updating is performed only if the confidence is higher than a pre-defined threshold.

In one embodiment of the present application, the ROI is centered at an object to be tracked.

In another aspect, an apparatus is proposed for adapting a pre-trained CNN to a target video, comprising: means for transforming a first feature map into a plurality of sub-feature maps, wherein the first feature map is generated by the pre-trained CNN according to a frame of the target video; means for convolving each of the sub-feature maps with one of a plurality of adaptive convolution kernels, respectively, to output a plurality of second feature maps with improved adaptability; and means for training, frame by frame, the adaptive convolution kernels.

In one embodiment of the present application, the means for transforming and the means for convolving are organized in an adaptive CNN comprising: a first convolution layer, linked to the pre-trained CNN and configured to transform the first feature map into the plurality of sub-feature maps; and a second convolution layer, linked to the first convolution layer and configured to convolve each of the sub-feature maps with one of the adaptive convolution kernels, respectively.

In one embodiment of the present application, the training comprises: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converge, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively; and optimizing, according to a subsequent frame of the target video, the parameters grouped in the candidate set.

In one embodiment of the present application, the optimizing comprises: feeding a second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels; and if any of the second training errors is higher than a threshold, back-propagating the second training errors through the pre-trained CNN and the adaptive CNN to further refine the parameters in the candidate set; and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In another aspect, an apparatus is proposed for an object online tracking. The apparatus comprises a feature extraction unit, configured for: determining a region of interest (ROI) in a first frame of a target video; and feeding the determined ROI forward through a pre-trained CNN to extract an initial feature map thereof. The apparatus further comprises: an initialization and update unit, configured for initializing, with the initial feature map, an adaptive CNN used for detecting a location of the object and a scale estimation network used for defining a scale of the object; a location prediction unit, configured for predicting, with the initialized adaptive CNN, a second location of the object in a second frame of the target video, wherein the second frame is subsequent to the first frame; and a scale estimation unit, configured for estimating, with the initialized scale estimation network, a second scale of the object in the second frame of the target video. In addition, the initialization and update unit is further configured for updating, with optimized network parameters acquired in the predicting and the estimating, the adaptive CNN and the scale estimation network, respectively; the location prediction unit is further configured for predicting, with the updated adaptive CNN, a third location of the object in a third frame of the target video, wherein the third frame is subsequent to the second frame; and the scale estimation unit is further configured for estimating, with the updated scale estimation network, a third scale of the object in the third frame of the target video.

In one embodiment of the present application, the adaptive CNN comprises: a first convolution layer linked to the pre-trained CNN and configured to transform a first feature map into a plurality of sub-feature maps, wherein the first feature map is generated by the pre-trained CNN according to any frame of the target video; and a second convolution layer linked to the first convolution layer and configured to convolve each of the sub-feature maps with one of a plurality of adaptive convolution kernels, respectively, to output a plurality of second feature maps with improved adaptability.

In one embodiment of the present application, the adaptive CNN is initialized by: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converges, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively.

In one embodiment of the present application, the adaptive CNN is updated by: feeding a second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels, respectively; and if any of the second training errors is higher than a threshold, back-propagating the second training errors through the pre-trained CNN and the adaptive CNN to further refine the parameters in the candidate set; and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In one embodiment of the present application, the location of the object is predicted by a heat map generated by the adaptive CNN, wherein a location with a maximum value is predicted to be the location of the object and the maximum value is sampled as a confidence.

In one embodiment of the present application, the updating is performed only if the confidence is higher than a pre-defined threshold.

In one embodiment of the present application, the ROI is centered at an object to be tracked.

In another aspect, a non-transitory computer readable storage medium is proposed for storing computer readable instructions executable by a processor to perform operations, the operations comprising: transforming a first feature map into a plurality of sub-feature maps, wherein the first feature map is generated by the pre-trained CNN according to a frame of the target video; convolving each of the sub-feature maps with one of a plurality of adaptive convolution kernels, respectively, to output a plurality of second feature maps with improved adaptability; and training, frame by frame, the adaptive convolution kernels.

In another aspect, a non-transitory computer readable storage medium is proposed for storing computer readable instructions executable by a processor to perform operations, the operations comprising: determining a region of interest (ROI) in a first frame of a target video; feeding the determined ROI forward through a pre-trained Convolutional Neural Network (CNN) to extract an initial feature map thereof; initializing, with the initial feature map, an adaptive CNN used for detecting a location of the object and a scale estimation network used for defining a scale of the object; predicting, with the initialized adaptive CNN, a second location of the object in a second frame of the target video, wherein the second frame is subsequent to the first frame; estimating, with the initialized scale estimation network, a second scale of the object in the second frame of the target video; updating, with optimized network parameters acquired in the predicting and the estimating, the adaptive CNN and the scale estimation network, respectively; predicting, with the updated adaptive CNN, a third location of the object in a third frame of the target video, wherein the third frame is subsequent to the second frame; and estimating, with the updated scale estimation network, a third scale of the object in the third frame of the target video.

Based on the proposed CNN adaption method and system, pre-trained deep features can be effectively transferred for online application with a reduced over-fitting. The proposed object online tracking method, apparatus and system are constructed based on the proposed CNN adaption method, apparatus and system. Due to the reduced over-fitting, the proposed object online tracking method and system can perform an improved object online tracking.

BRIEF DESCRIPTION OF THE DRAWINGS

Exemplary non-limiting embodiments of the present application are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be appreciated by one skilled in the art that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present application. The present application may be practiced without some or all of these specific details. In other instances, well-known process operations have not been described in detail in order not to unnecessarily obscure the present application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Figure 1:
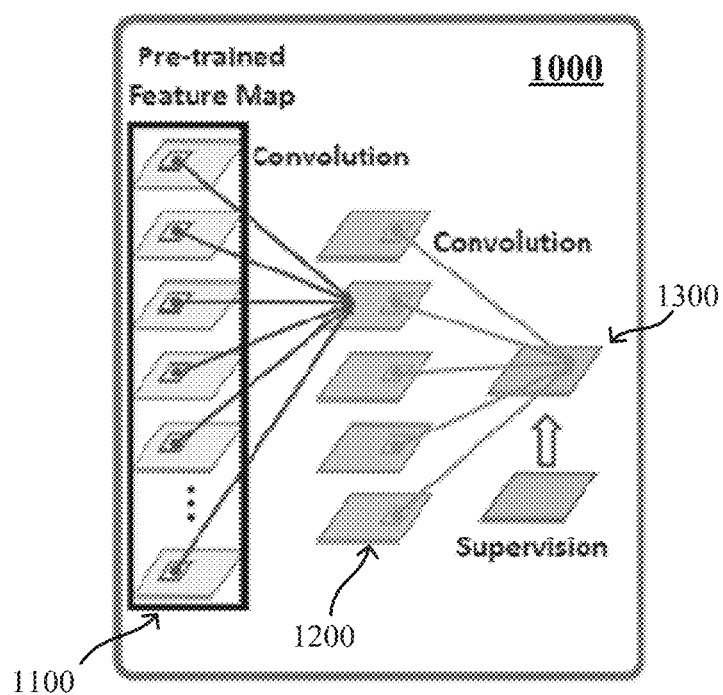
FIG. 1 illustrates a conventional method for adapting a pre-trained CNN to a target image.

For online applications, one simple approach to transfer offline pre-trained CNN features is to add one or more randomly initialized CNN layers, i.e., adaptive CNN, sequence to the pre-trained CNN model. Then the parameters, i.e. convolutional kernels and bias, of the pre-trained CNN is fixed while only the parameters of the adaptative CNN is trained online to fit the current task, for example, a target video or a target image. FIG. 1 illustrates such a conventional method 1000 for adapting a pre-trained CNN 1100 to a target image. As can be seen from FIG. 1, an adaptive CNN 1200 is disposed sequence to the pre-trained CNN 1100 and configured for refining the pre-trained features to a final adapted feature 1300 for supervision. However, as the parameters of the adaptive CNN 1200 are jointly learned during a training process, this transfer learning method suffers from severe over-fitting for an online application, where training sample with ground truth label is only provided in the first frame. The online learned parameters mainly focus on recent training samples and are less likely to well generalize to both historical and future samples. This phenomenon can be fatal to online visual tracking where the target often undergoes significant appearance changes or heavy occlusion.

Figure 2A:
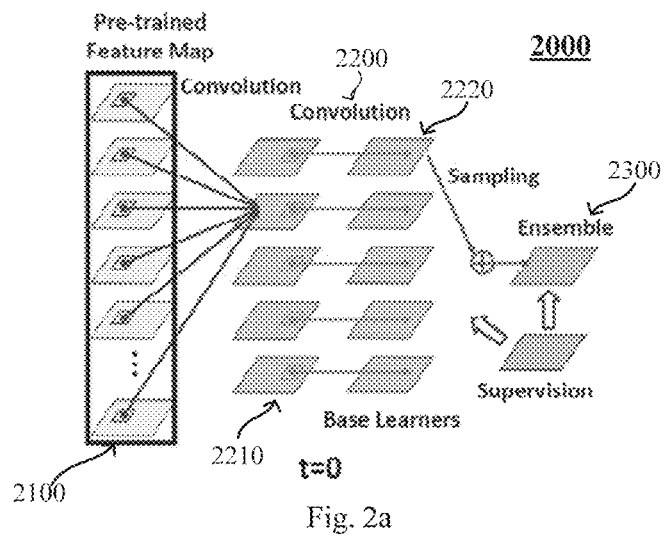
FIGS. 2a-2c illustrate an adaptive CNN for adapting a pre-trained CNN to a target video, according to an embodiment of the present application.
Figure 2B:
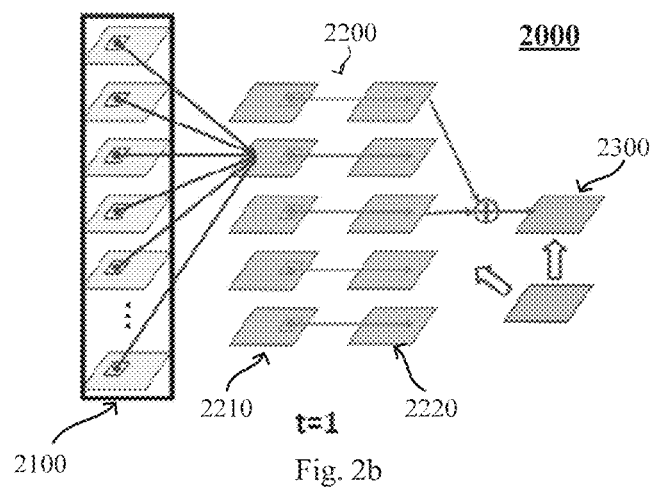
Figure 2C:
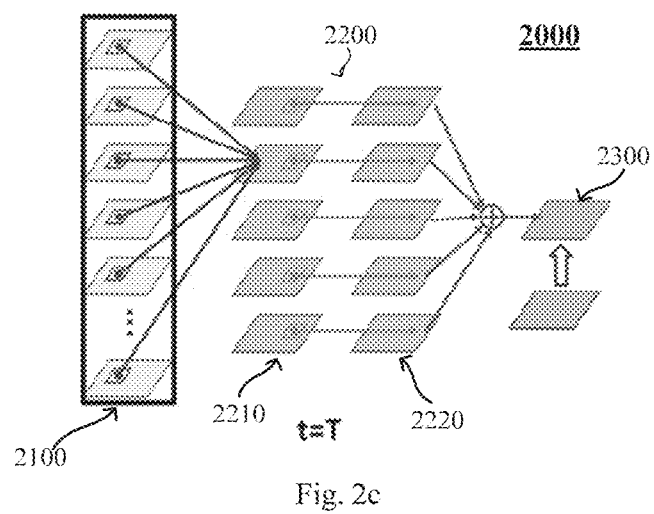

To tackle the above issue, an adaptive CNN 2200 is proposed for better transferring pre-trained deep features, as shown in FIG. 2a to FIG. 2c. The pre-trained CNN 2100 is denoted as CNN-E, and an RGB image is taken as input and a convolution feature map X is output. The online adaptive CNN 2200, denoted as CNN-A, is randomly initialized and consists of two convolution layers interleaved with a ReLU layer as the nonlinear activation unit. The first convolution layer is linked to the pre-trained CNN 2100 and configured to transform the first feature map into the plurality of sub-feature maps. The second convolution layer is linked to the first convolution layer and configured to convolve each of the sub-feature maps with one of the adaptive convolution kernels, respectively. The online adaptive CNN 2200 takes the feature map X as input and generates the final feature map 2300, which is formulated by:

$$\{F_2^c(X)|c=1,2,\ldots,C_2\} \quad (1)$$

where $F_2^c(X) \in \mathbb{R}^{m \times n}$ indicates the c-th channel of the sub-feature map generated by the second convolution layer with spatial size of m×n. The sub-feature map in the second layer is obtained by convolving the kernel with the sub-feature map in the first layer as:

$$F_2^c(X) = \sum_{k=1}^{C_1} w_k^c * F_1^k(X) + b_c, \quad (2)$$

where $C_1$ denotes the number of channels of the sub-feature map output by the first convolution layer; $w_k^c$ denotes the convolution kernel connecting the k-th channel of the first convolution layer sub-feature map with the c-th channel of the second convolution layer sub-feature map; $b_c$ is the bias and the symbol "*" denotes a convolution operation. The summation is conducted over all the channels.

In order to introduce randomness into the parameter learning process, the output sub-feature map is regarded as an set of base learners, formulated by:

$$F_2^c(X) = \Sigma_{k=1}^{C_1} f(X; \gamma_k^c) \quad (3)$$

where each base leaner is defined as:

$$f(X; \gamma_k^c) = w_k^c * F_1^k(X) + b_c^k \quad (4)$$

and the parameter $\gamma_k^c$ indicates the corresponding kernel weights and bias in both the first and second convolution layers of CNN-A.

The online training of the CNN-A network is then equivalent to online training each base learner and to sequentially sample a well-trained parameter for each of base learners into an ensemble set. Since the proposed online training method is conducted independently in each channel of the output sub-feature map, in the following discussion, only one output channel will be discussed as an example to describe the training method. For notification simplicity, the superscript channel number is omitted and the notation $\{\gamma_k|k=1, 2, \ldots, C_1\}$ is used to denote the parameters of the base learners for any one output sub-feature map channel.

Figure 3:
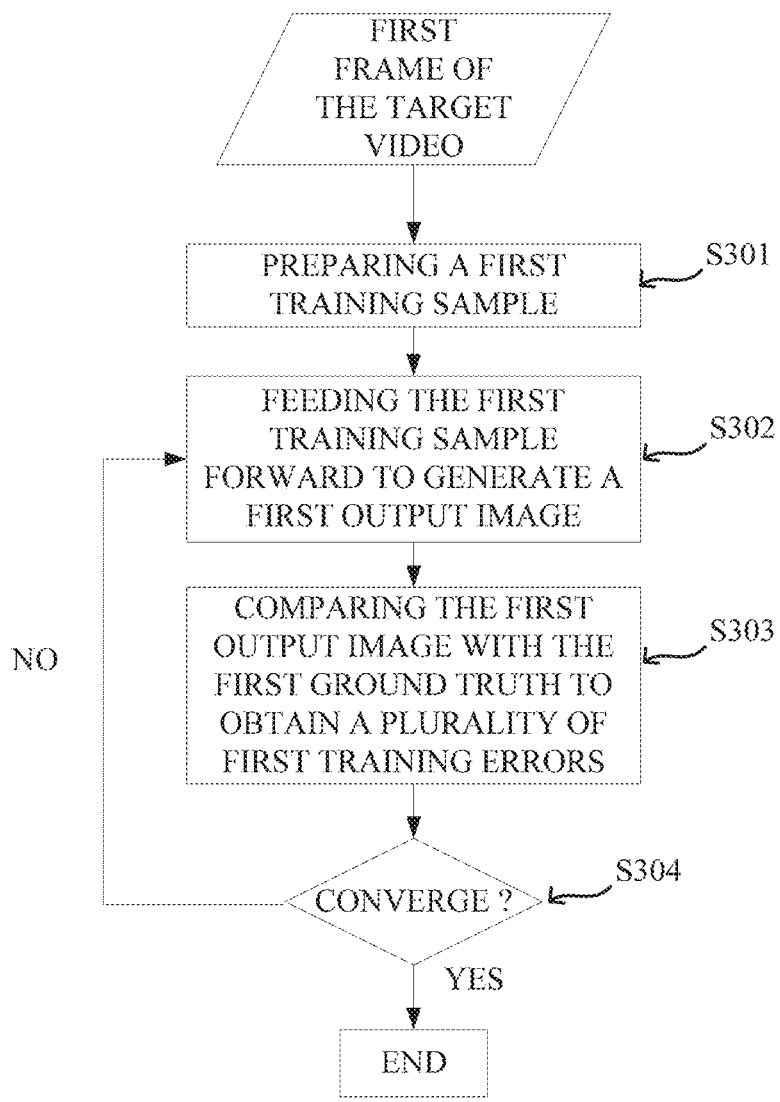
FIG. 3 is a flowchart illustrating the initialization of the adaptive CNN, according to an embodiment of the present application.

FIG. 3 shows how the online training process is initialized. At the beginning of the online training process, a first training sample is prepared according to a first frame of the target video at step S301. The strategy for preparing a training sample from a given image, such as a stochastic gradient descent (SGD), is well-known to one skilled in the art and thus will not be discussed in detail hereinafter. The first training sample is then fed forward, at step S302, through the pre-trained CNN and the adaptive CNN to generate a first output image. Then at step S303, the first output image is compared with the first ground truth, which is derived from the first frame, to obtain a plurality of first training errors for the plurality of adaptive convolution kernels, respectively. The first training errors are back-propagated, through the pre-trained CNN and the adaptive CNN to train the adaptive convolution kernels in an iterative manner until the first training errors converge, as shown at step S304.

In one implement, a plurality of parameters are trained for each of the adaptive convolution kernels, respectively, after the initialization. The parameter γ* with the smallest training error is selected and grouped into an ensemble set $\mathcal{E}$ and the rest of trained parameters are grouped into a candidate set $\mathcal{C}$. The parameters in the candidate set will be optimized in following frames of the target video. However, in an alternative implement, two or more parameters with smallest training errors may be selected into the ensemble set.

In the following training process, i.e., an optimizing process, the parameters in the candidate set are sequentially added to the ensemble set in a similar manner. Since the optimizing process is similar to that of the initialization, such as the preparing, the feeding, the comparing and the back-propagating, only the difference will be discussed hereinafter.

In the optimizing process, all the parameters in the ensemble set are used to form an ensemble with output $$F(X; \varepsilon) = \frac{1}{|\varepsilon|} \sum_{\gamma_i \in \varepsilon} f(X; \gamma_i)$$

for online testing. At the t-th step, a newly training sample $X_t$ with target output $Y_t$ is obtained. The parameters in the ensemble set ε is jointly refined, for example by SGD with the loss function $L_\varepsilon = L(Y_t, F(X_t; \varepsilon))$. Meanwhile, each parameter $\gamma_j \in \mathcal{C}$ is refined independently, for example by SGD using with following loss function:

$$L^{L_{\mathcal{C}}}(Y_t,f(X_t;\gamma_j)) = L(Y_t,f(X_t;\gamma_j)) + \eta F(X_t;\varepsilon)) \quad (5)$$

where $F(X_t; \varepsilon)$ is fixed and the parameter η is used to balance the impact of the ensemble on the candidate parameters, such that the refining of the parameter $\gamma_j \in \mathcal{C}$ considers both the target output $Y_t$ and the output of the ensemble $F(X_t; \varepsilon)$. If the training error $L_\varepsilon$ is higher than a predefined threshold and the candidate set C is not empty, a refined parameter is sampled from the candidate set C, for example, according to the following sampling probability density $$p(\gamma) = q(L^{\mathcal{C}}(Y_t,f(X_t;\gamma))), \gamma \in \mathcal{C} \quad (6)$$

where q(•) is a monotonically decreasing function. Thus the sampled parameter is removed from the candidate set C and added into the ensemble set ε. The above online training approach is conducted sequentially in each time step. When all the parameters are sampled from the candidate set to the ensemble set, the ensemble F(X; ε) evolves into a well-trained CNN model. In an alternate implement, the parameters incorporated in the well-trained CNN model would still be jointly updated with a further training process during the period of the subsequent frames. The proposed adaptive CNN demonstrate a moderate diversity since the parameters thereof are trained independently, especially by using different loss criterions.

In one embodiment, a mask layer may be contained in the adaptive CNN and linked to the second convolution layer to further reduce a correlation among the sub-feature maps. Specifically, each channel of the output sub-feature map from the second convolution layer is associated with an individual binary mask which has the same spatial size with the sub-feature map. All the masks are initialized in a random manner and then fixed throughout the online training process. The forward propagation of the convolution layer at the training stage is then conducted as $$F^c = \sum_{k=1}^{K} w_k^c * (M^c \odot X^k) + b_c \quad (7)$$

where $X^k$ indicates the k-th channel of the sub-feature map; $M^c$ denotes the binary mask associated with the c-th channel of the output feature map $F^c$; and the symbol "□" denotes a Hadamard product. Accordingly, the backward propagation is also conducted by considering the binary masks. Trained in this way, the learned convolution kernels are enforced to focus on different part of the input feature maps through the binary masks.

Figure 4:
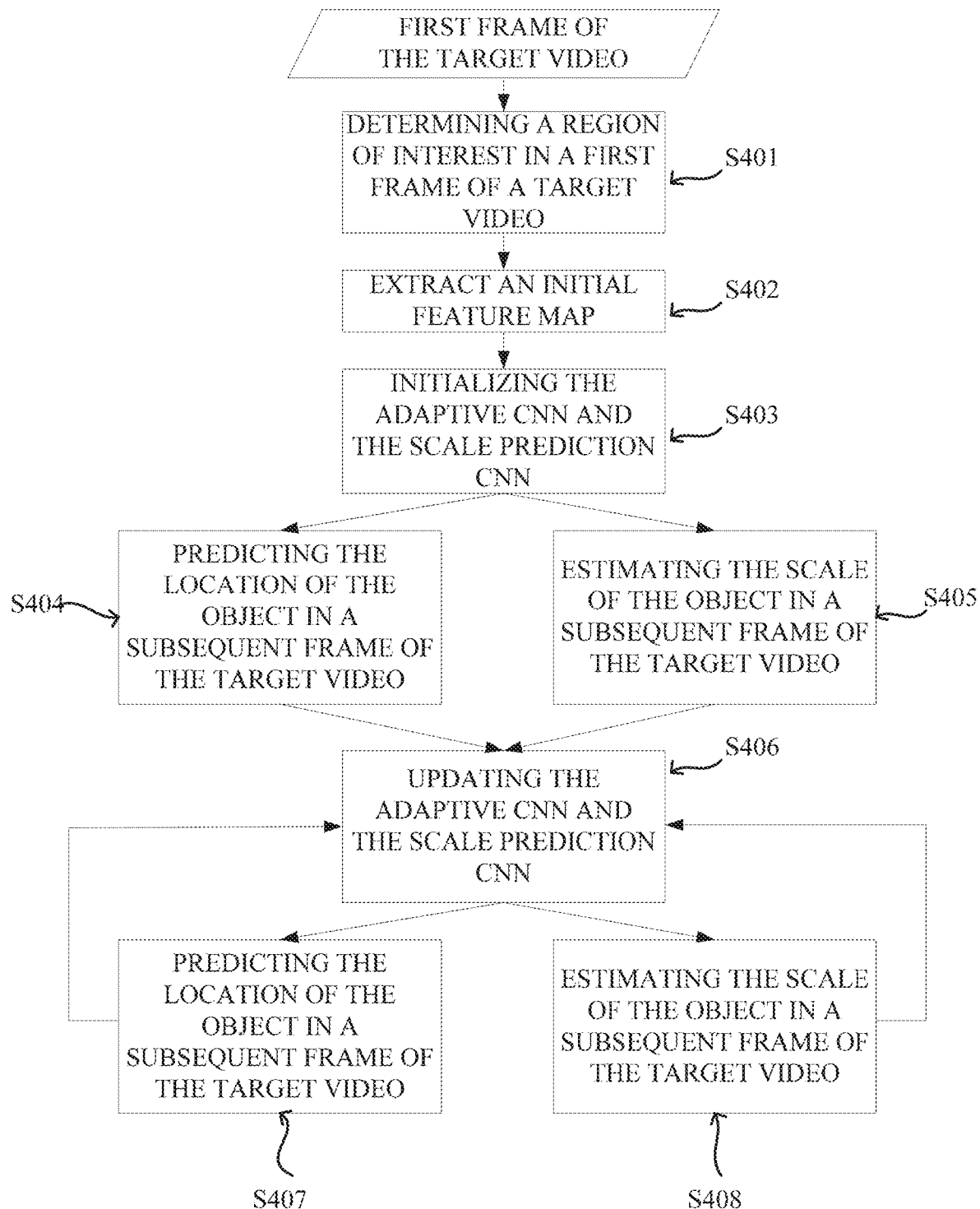
FIG. 4 is a flowchart illustrating the process of object online tracking, according to an embodiment of the present application.

In another aspect, a method is proposed for an object online tracking. FIG. 4 schematically illustrates a general flowchart for an object online tracking. At the beginning of the tracking process, as shown at step S401, a target object is manually selected with a target boundary box in the first frame of the video, and accordingly, a region of interest (ROI) is determined. In one implement, the ROI is centered at the target object. In a further implement, the ROI may have twice the size of the target boundary box, as an example. At step S402, the ROI is fed forward a pre-trained CNN to extract an initial feature map for initialization. The initial feature map comprises the information of the location and the scale of the target object in the first frame. At step S403, an adaptive CNN and a scale estimation network is initialized with the initial feature map, wherein adaptive CNN is utilized to predict the location of the target object and the scale estimation network is utilized to estimate the scale of the target object. The scale estimation process will be further described in the following paragraphs. With the initialized adaptive CNN and the scale estimation network, the location and scale of the target object is predicted and estimated in a following frame, for example, a second frame of the target video, as shown at step S404 and S405. Besides, the process of location prediction and scale estimation is also a training process, which gives a plurality of optimized parameters for the adaptive CNN and the scale estimation network, respectively. With the optimized parameters, the adaptive CNN and the scale estimation network are jointly updated at step S406. After updating process, both the adaptive CNN and the scale estimation network have better adaptabilities with respect to the relating frame. The location and scale of target object in the subsequent frames of the target video will be predicted and estimated based on the updated adaptive CNN (step S407 and S408). The result of the prediction and estimation further updates, in turn, the adaptive CNN and the scale estimation network.

Figure 5:
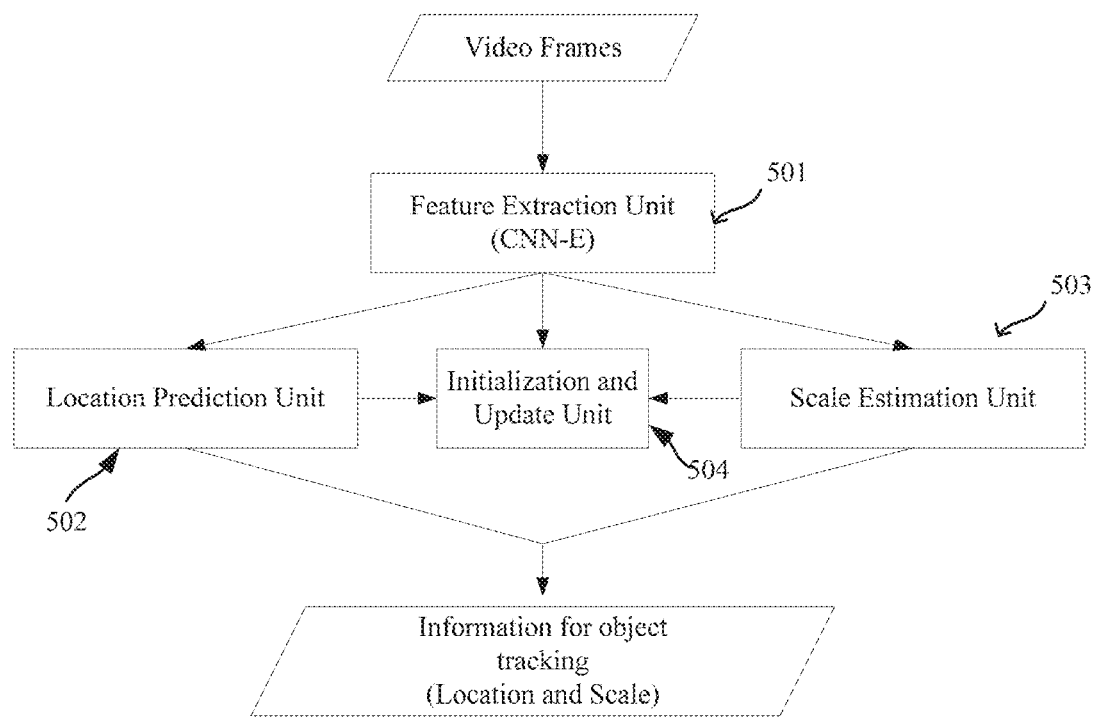
FIG. 5 is a schematic diagram illustrating a system architecture for the object online tracking, according to an embodiment of the present application.

The above-mentioned object online tracking process may be implemented in a system illustrated in FIG. 5. A feature extraction unit 501 comprising a pre-trained CNN, i.e., CNN-E, is configured to determine a ROI and to extract the feature of any frame. The extracted feature is transmitted to a location prediction unit 502 comprising the adaptive CNN and a scale estimation unit 503 comprising the scale estimation network. In addition, the extracted feature is also transmitted to an initialization and update unit 504 for initializing at the first frame of the target video. In subsequent frames, the extracted feature map of the current frame and the output from the location prediction unit 502 and scale estimation unit 503 are transmitted to the initialization and update unit 504 to update the adaptive CNN and the scale estimation network.

The structure, the initializing and the optimizing of the adaptive CNN is previously discussed and will not be further detailed hereinafter. In the case of object online tracking, the adaptive CNN is specifically used to transform, by performing a heat map regression, the feature map extracted from the pre-trained CNN into a target heat map. The location of the target object is then determined by the location on the heat map with the maximum value and the corresponding maximum heat map value serves as the confidence of this prediction. In one embodiment, the updating of the adaptive CNN and the scale estimation network are conducted only if the confidence is higher than a pre-defined threshold, in order to avoid updating using contaminated training sample.

The scale estimation network has a conventional deep learning network structure, such as a CNN or a fully-connected network, and thus would not be described in detail herein. In the case of object online tracking, the scale prediction unit receives the feature map extracted from the pre-trained network and applies a set of pre-defined scale transformations to obtain the corresponding scale-transformed feature maps. The scale-transformed feature maps are fed forward through the scale estimation network, which assigns a score for each scale transformation. The scale with the highest score is then predicted as the current scale of the target. With the location and the scale resulted from the tracking system, the target object will be tracked at an improved precision.

Figure 6:
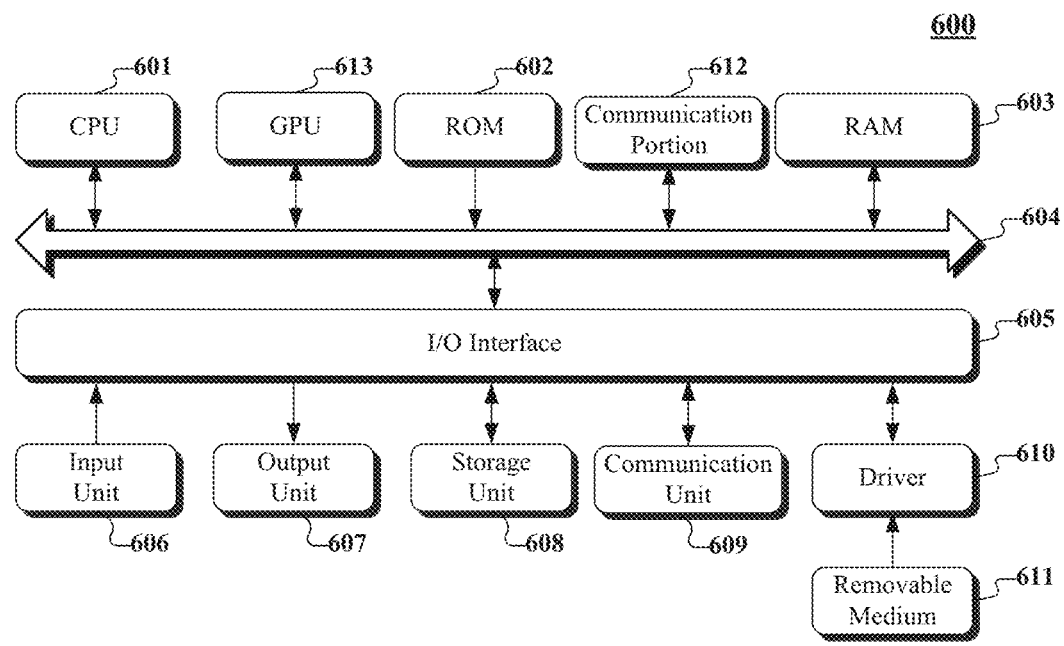
FIG. 6 is a schematic diagram illustrating a system adapted to implement the present application.

FIG. 6 is a schematic diagram illustrating a system adapted to implement the present application.

The system 600 may be a mobile terminal, a personal computer (PC), a tablet computer, a server, etc. In FIG. 6, the system 600 includes one or more processors, a communication portion, etc. The one or more processors may be: one or more central processing units (CPUs) 601 and/or one or more image processor (GPUs) 613, etc. The processor may perform various suitable actions and processes in accordance with executable instructions stored in the read-only memory (ROM) 602 or executable instructions loaded from the storage unit 608 into the random access memory (RAM) 603. The communication portion 612 may include, but is not limited to a network card. The network card may include, but is not limited to an IB (Infiniband) network card. The processor may communicate with the read-only memory 602 and/or the RAM 603 to execute the executable instructions, connect to the communication portion 612 through the bus 604 and communicate with other target devices through the communication portion 612 to complete the corresponding step in the present application. In a specific example of the present application, the steps performed by the processor includes: determining a region of interest (ROI) in a first frame of a target video; feeding the determined ROI forward through a pre-trained CNN to extract an initial feature map thereof; initializing, with the initial feature map, an adaptive CNN used for detecting a location of the object and a scale estimation network used for defining a scale of the object; predicting, with the initialized adaptive CNN, a second location of the object in a second frame of the target video, wherein the second frame is subsequent to the first frame; estimating, with the initialized scale estimation network, a second scale of the object in the second frame of the target video; updating, with optimized network parameters acquired in the predicting and the estimating, the adaptive CNN and the scale estimation network, respectively; predicting, with the updated adaptive CNN, a third location of the object in a third frame of the target video, wherein the third frame is subsequent to the second frame; and estimating, with the updated scale estimation network, a third scale of the object in the third frame of the target video.

In addition, in the RAM 603, various programs and data required by operation of the apparatus may also be stored. The CPU 601, the ROM 602 and the RAM 603 are connected to each other through the bus 604. Where RAM 603 exists, the ROM 602 is an optional module. The RAM 603 stores executable instructions or writes executable instructions to the ROM 602 during operation, and the executable instructions cause the central processing unit 601 to perform the steps included in the image processing method of any of the embodiments of the present application. The input/output (I/O) interface 605 is also connected to the bus 604. The communication portion 612 may be integrated, and may also be provided with a plurality of sub-modules (e.g., a plurality of IB network cards) and connected to the bus 604, respectively.

The following components are connected to the I/O interface 605: an input unit 606 including a keyboard, a mouse, and the like; an output unit 607 including such as a cathode ray tube (CRT), a liquid crystal display (LCD) and a loudspeaker, and the like; a storage unit 608 including a hard disk, and the like; and a communication unit 609 including a network interface card such as a LAN card, a modem, and the like. The communication unit 609 performs communication processing via a network such as the Internet. A driver 610 also connects to the I/O interface 605 as needed. A removable medium 611, such as a magnetic disk, an optical disk, a magneto-optical disk, a semiconductor memory, is installed on the driver 610 as needed so that computer programs read therefrom are installed in the storage unit 608 as needed.

It should be noted that the architecture shown in FIG. 6 is only an alternative implementation. During the specific practice process, the number and types of parts as shown in FIG. 6 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described above with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the image processing method provided by any of the embodiments of the present application, including: determining a region of interest (ROI) in a first frame of a target video; feeding the determined ROI forward through a pre-trained CNN to extract an initial feature map thereof; initializing, with the initial feature map, an adaptive CNN used for detecting a location of the object and a scale estimation network used for defining a scale of the object; predicting, with the initialized adaptive CNN, a second location of the object in a second frame of the target video, wherein the second frame is subsequent to the first frame; estimating, with the initialized scale estimation network, a second scale of the object in the second frame of the target video; updating, with optimized network parameters acquired in the predicting and the estimating, the adaptive CNN and the scale estimation network, respectively; predicting, with the updated adaptive CNN, a third location of the object in a third frame of the target video, wherein the third frame is subsequent to the second frame; and estimating, with the updated scale estimation network, a third scale of the object in the third frame of the target video.

In such embodiments, the computer program may be downloaded and installed from the network through the communication unit 609, and/or installed from the removable medium 611. When the computer program is executed by the central processing unit (CPU) 601, the above-described instruction described in the present application is executed.

Figure 7:
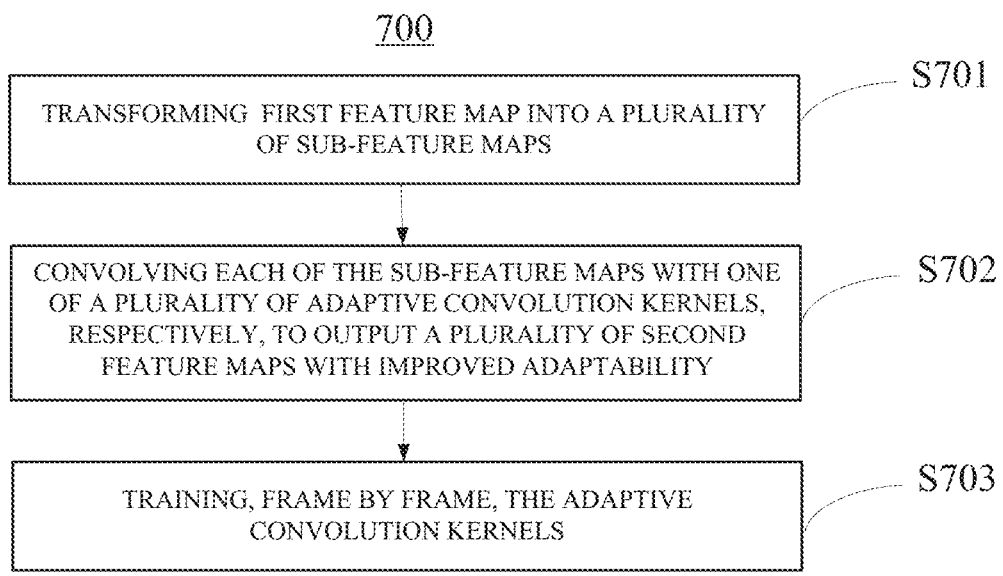
FIG. 7 is flowchart illustrating a method for adapting a pre-trained CNN to a target video, according to an embodiment of the present application.

FIG. 7 is flowchart illustrating a method 700 for adapting a pre-trained CNN to a target video, according to an embodiment of the present application. At step S701, a first feature map is transformed into a plurality of sub-feature maps, wherein the first feature map is generated by the pre-trained CNN according to a frame of the target video. At step S702, each of the sub-feature maps is convolved with one of a plurality of adaptive convolution kernels, respectively, to output a plurality of second feature maps with improved adaptability. At step S703, the adaptive convolution kernels are trained frame by frame.

In one embodiment of the present application, the transforming and the convolving are implemented in an adaptive CNN comprising: a first convolution layer, linked to the pre-trained CNN and configured to transform the first feature map into the plurality of sub-feature maps; and a second convolution layer, linked to the first convolution layer and configured to convolve each of the sub-feature maps with one of the adaptive convolution kernels, respectively.

In one embodiment of the present application, the training comprises: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converge, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively; and optimizing, according to a subsequent frame of the target video, the parameters grouped in the candidate set.

In one embodiment of the present application, the optimizing comprises: feeding the second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels; and if any of the second training errors is higher than a threshold, back-propagating the second training errors through the pre-trained CNN and the adaptive CNN to further refine the parameters in the candidate set and transferring at least one of the further refined parameters to the ensemble set.

In one embodiment of the present application, each of the adaptive convolution kernels is trained under a different loss criterion.

In one embodiment of the present application, the method further comprises further reducing, by a mask layer, a correlation among the sub-feature maps, wherein the mask layer is linked to the second convolution layer of the adaptive CNN.

In one embodiment of the present application, the mask layer comprises a plurality of binary masks, each of which is convolved with one of the sub-feature maps and has a same spatial size with the convolved sub-feature map.

Figure 8:
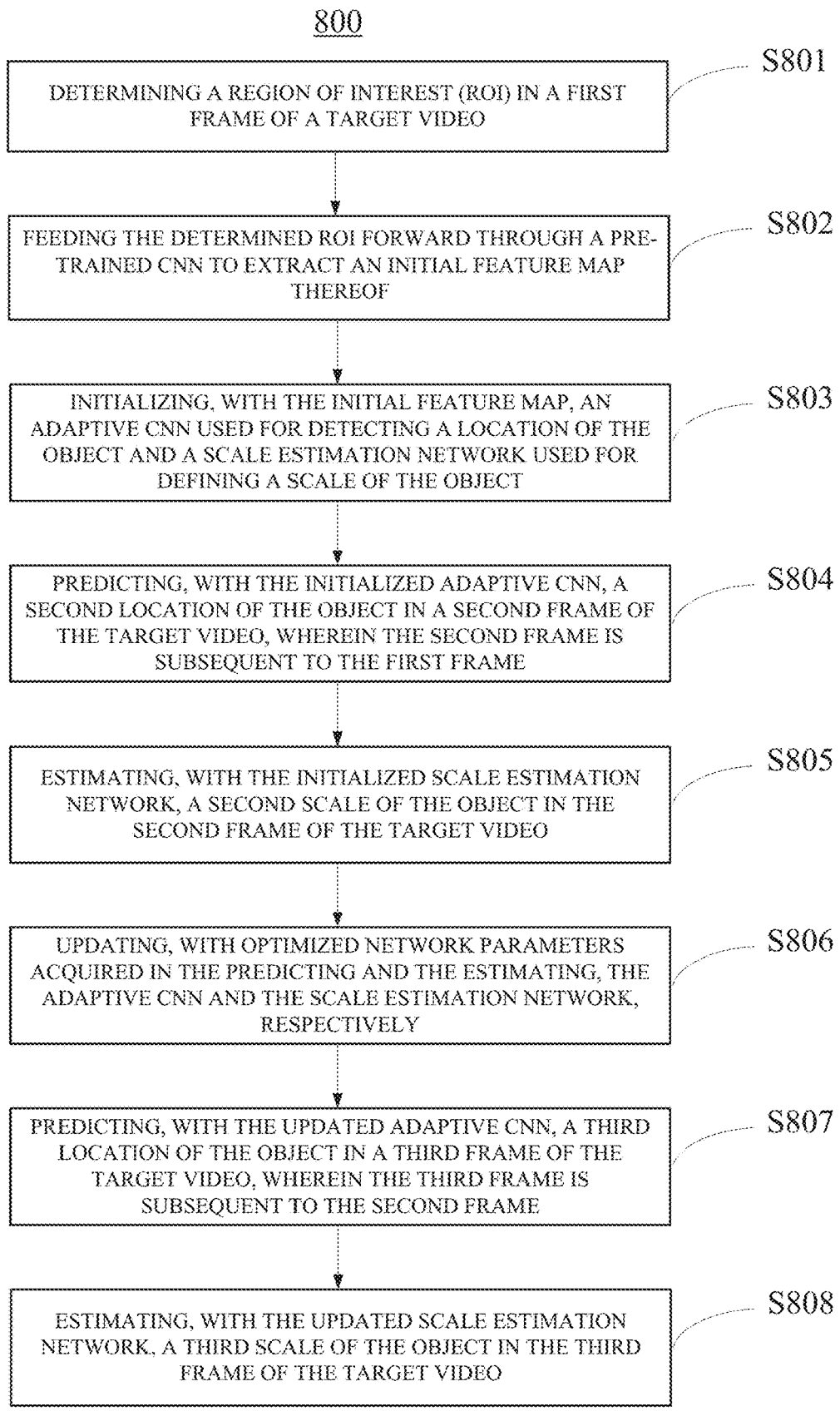
FIG. 8 is flowchart illustrating a method for an object online tracking, according to an embodiment of the present application.

FIG. 8 is flowchart illustrating a method 800 for an object online tracking, according to an embodiment of the present application. At step S801, a region of interest (ROI) is determined from a first frame of a target video. At step S802, the determined ROI is fed forward through a pre-trained CNN to extract an initial feature map thereof. At step S803, an adaptive CNN used for detecting a location of the object and a scale estimation network used for defining a scale of the object are initialized by using the initial feature map. At step S804, a second location of the object in a second frame of the target video, wherein the second frame is subsequent to the first frame is predicted by using the initialized adaptive CNN. At step S805, a second scale of the object in the second frame of the target video is estimated by using the initialized scale estimation network. At step S806, the adaptive CNN and the scale estimation network are updated respectively by using optimized network parameters acquired in the predicting and the estimating. At step S807, a third location of the object in a third frame of the target video is predicted by using the updated adaptive CNN, wherein the third frame is subsequent to the second frame. At step S808, a third scale of the object in the third frame of the target video is estimated by using the updated scale estimation network.

In one embodiment of the present application, the adaptive CNN comprises: a first convolution layer, linked to the pre-trained CNN and configured to transform a first feature map into a plurality of sub-feature maps, wherein the first feature map is generated by the pre-trained CNN according to any frame of the target video; and a second convolution layer, linked to the first convolution layer and configured to convolve each of the sub-feature maps with one of a plurality of adaptive convolution kernels, respectively, to output a plurality of second feature maps with improved adaptability.

In one embodiment of the present application, the adaptive CNN is initialized by: feeding a first training sample forward through the pre-trained CNN and the adaptive CNN to generate a first output image, wherein the first training sample is obtained according to a first frame of the target video; comparing the generated first output image with a first ground truth derived from the first frame to obtain a plurality of first training errors for the adaptive convolution kernels, respectively; back-propagating repeatedly the first training errors through the pre-trained CNN and the adaptive CNN to train the adaptive convolution kernels until the first training errors converges, wherein a plurality of parameters are obtained for the trained adaptive convolution kernels, respectively; grouping a parameter of the obtained parameters, which has a smallest first training error, and a rest of the obtained parameters into an ensemble set and a candidate set, respectively.

In one embodiment of the present application, the adaptive CNN is updated by: feeding a second training sample forward through the pre-trained CNN and the adaptive CNN to generate a second output image, wherein the second training sample is obtained according to a second frame of the target video and the second frame is subsequent to the first frame; comparing the second output image with a second ground truth derived from the second frame to obtain a plurality of second training errors for the plurality of adaptive convolution kernels, respectively; and if any of the second training errors is higher than a threshold, back-propagating the second training errors through the pre-trained CNN and the adaptive CNN to further refine the parameters in the candidate set and transferring at least one of the further refined parameters to the ensemble set.

In one embodiment of the present application, each of the adaptive convolution kernels is trained under a different loss criterion.

In one embodiment of the present application, the adaptive CNN further comprises a mask layer linked to the second convolution layer to further reduce a correlation among the sub-feature maps.

In one embodiment of the present application, the mask layer comprises a plurality of binary masks, each of which is convolved with one of the sub-feature maps and has a same spatial size with the convolved sub-feature map.

In one embodiment of the present application, the location of the object is predicted by a heat map generated by the adaptive CNN, wherein a location with a maximum value is predicted to be the location of the object and the maximum value is sampled as a confidence.

In one embodiment of the present application, the updating is performed only if the confidence is higher than a pre-defined threshold.

In one embodiment of the present application, the ROI is centered at an object to be tracked.

As will be appreciated by one skilled in the art, the present application may be embodied as a system, a method or a computer program product. Accordingly, the present application may take the form of an entirely hardware embodiment and hardware aspects that may all generally be referred to herein as a "unit", "circuit", "module", or "system". Much of the inventive functionality and many of the inventive principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present application, further discussion of such software and ICs, if any, will be limited to the essentials with respect to the principles and concepts used by the preferred embodiments. In addition, the present invention may take the form of an entirely software embodiment (including firmware, resident software, micro-code, etc.) or an embodiment combining software. For example, the system may comprise a memory that stores executable components and a processor, electrically coupled to the memory to execute the executable components to perform operations of the system, as discussed in reference to FIGS. 1-6. Furthermore, the present invention may take the form of a computer program product embodied in any tangible medium of expression having computer-usable program code embodied in the medium.

Although the preferred examples of the present application have been described, those skilled in the art can make variations or modifications to these examples upon knowing the basic inventive concept. The appended claims are intended to be considered as comprising the preferred examples and all the variations or modifications fell into the scope of the present application.

Obviously, those skilled in the art can make variations or modifications to the present application without departing the spirit and scope of the present application. As such, if these variations or modifications belong to the scope of the claims and equivalent technique, they may also fall into the scope of the present application.

What is claimed is:

1. A method for adapting a pre-trained Convolutional Neural Network (CNN) to a target video, comprising:
   transforming a first feature map into a plurality of sub-feature maps, wherein the first feature map is generated by the pre-trained CNN according to a frame of the target video, and a correlation among at least some of the plurality of sub-feature maps is reduced by a mask layer;
   convolving each of the sub-feature maps with one of a plurality of adaptive convolution kernels, respectively, to output a plurality of second feature maps with improved adaptability, wherein the transforming and the convolving are implemented in an adaptive CNN comprising:
     a first convolution layer, linked to the pre-trained CNN and configured to transform the first feature map into the plurality of sub-feature maps; and
     a second convolution layer, linked to the first convolution layer and configured to convolve each of the sub-feature maps with one of the adaptive convolution kernels, respectively; and
   feeding a first training sample forward through the pre-trained CNN and the adaptive CNN to generate a first output image, wherein the first training sample is obtained according to a first frame of the target video;
   comparing the generated first output image with a first ground truth derived from the first frame to obtain a plurality of first training errors for the adaptive convolution kernels, respectively;
   back-propagating repeatedly the first training errors through the pre-trained CNN and the adaptive CNN to train the adaptive convolution kernels until the first training errors converge, wherein a plurality of parameters are obtained for the trained adaptive convolution kernels, respectively;
   grouping a parameter of the obtained parameters, which has a smallest first training error, and a rest of the obtained parameters into an ensemble set and a candidate set, respectively; and
   optimizing, according to a subsequent frame of the target video, the parameters grouped in the candidate set.

2. The method of claim 1, wherein the optimizing comprises:
   feeding a second training sample forward through the pre-trained CNN and the adaptive CNN to generate a second output image, wherein the second training sample is obtained according to a second frame of the target video and the second frame is subsequent to the firs frame;
   comparing the second output image with a second ground truth derived from the second frame to obtain a plurality of second training errors for the plurality of adaptive convolution kernels; and
   if any of the second training errors is higher than a threshold,
   back-propagating the second training errors through the pre-trained CNN and the adaptive CNN to further refine the parameters in the candidate set; and
   transferring at least one of the further refined parameters to the ensemble set.

3. The method of claim 1, wherein the mask layer is linked to the second convolution layer of the adaptive CNN.

4. A system for adapting a pre-trained CNN to a target video, comprising:
   a memory that stores executable components; and
   a processor electrically coupled to the memory to execute the method of claim 1.

5. A non-transitory computer readable storage medium for storing computer readable instructions executable by a processor to perform the method of claim 1.

6. The method of claim 1, wherein each of the adaptive convolution kernels is trained under a different loss criterion.

7. A method for an object online tracking, comprising:
   determining a region of interest (ROI) in a first frame of a target video;
   feeding the determined ROI forward through a pre-trained Convolutional Neural Network (CNN) to extract an initial feature map thereof;
   initializing, with the initial feature map, an adaptive CNN used for detecting a location of the object and a scale estimation network used for defining a scale of the object;
   predicting, with the initialized adaptive CNN, a second location of the object in a second frame of the target video, wherein the second frame is subsequent to the first frame;
   estimating, with the initialized scale estimation network, a second scale of the object in the second frame of the target video;
   updating, with optimized network parameters acquired in the predicting and the estimating, the adaptive CNN and the scale estimation network, respectively;
   predicting, with the updated adaptive CNN, a third location of the object in a third frame of the target video, wherein the third frame is subsequent to the second frame; and
   estimating, with the updated scale estimation network, a third scale of the object in the third frame of the target video.

8. The method of claim 7, wherein the adaptive CNN comprises:
   a first convolution layer, linked to the pre-trained CNN and configured to transform a first feature map into a plurality of sub-feature maps, wherein the first feature map is generated by the pre-trained CNN according to any frame of the target video; and
   a second convolution layer, linked to the first convolution layer and configured to convolve each of the sub-feature maps with one of a plurality of adaptive convolution kernels, respectively, to output a plurality of second feature maps with improved adaptability.

9. The method of claim 8, wherein the adaptive CNN is initialized by:
   feeding a first training sample forward through the pre-trained CNN and the adaptive CNN to generate a first output image, wherein the first training sample is obtained according to a first frame of the target video;
   comparing the generated first output image with a first ground truth derived from the first frame to obtain a plurality of first training errors for the adaptive convolution kernels, respectively;
   back-propagating repeatedly the first training errors through the pre-trained CNN and the adaptive CNN to train the adaptive convolution kernels until the first training errors converges, wherein a plurality of parameters are obtained for the trained adaptive convolution kernels, respectively;

grouping a parameter of the obtained parameters, which has a smallest first training error, and a rest of the obtained parameters into an ensemble set and a candidate set, respectively.

10. The method of claim 8, wherein the adaptive CNN is updated by:

feeding the second training sample forward through the pre-trained CNN and the adaptive CNN to generate a second output image, wherein the second training sample is obtained according to a second frame of the target video and the second frame is subsequent to the first frame;

comparing the second output image with a second ground truth derived from the second frame to obtain a plurality of second training errors for the plurality of adaptive convolution kernels, respectively; and if any of the second training errors is higher than a threshold, back-propagating the second training errors through the pre-trained CNN and the adaptive CNN to further refine the parameters in the candidate set; and transferring at least one of the further refined parameters to the ensemble set.

11. The method of claim 8, wherein each of the adaptive convolution kernels is trained under a different loss criterion.

12. The method of claim 8, wherein the adaptive CNN further comprises a mask layer linked to the second convolution layer to further reduce a correlation among the sub-feature maps.

13. The method of claim 12, wherein the mask layer comprises a plurality of binary masks, each of which is convolved with one of the sub-feature maps and has a same spatial size with the convolved sub-feature map.

14. The method of claim 8, wherein the location of the object is predicted by a heat map generated by the adaptive CNN, wherein a location with a maximum value is predicted to be the location of the object and the maximum value is sampled as a confidence.

15. The method of claim 14, wherein the updating is performed only if the confidence is higher than a pre-defined threshold.

16. A system for an object online tracking, comprising:
a memory that stores executable components; and
a processor electrically coupled to the memory to execute the executable components for:

determining a region of interest (ROI) in a first frame of a target video;

feeding the determined ROI forward through a pre-trained Convolutional Neural Network (CNN) to extract an initial feature map thereof;

initializing, with the initial feature map, an adaptive CNN used for detecting a location of the object and a scale estimation network used for defining a scale of the object;

predicting, with the initialized adaptive CNN, a second location of the object in a second frame of the target video, wherein the second frame is subsequent to the first frame;

estimating, with the initialized scale estimation network, a second scale of the object in the second frame of the target video;

updating, with optimized network parameters acquired in the predicting and the estimating, the adaptive CNN and the scale estimation network, respectively;

predicting, with the updated adaptive CNN, a third location of the object in a third frame of the target video, wherein the third frame is subsequent to the second frame; and estimating, with the updated scale estimation network, a third scale of the object in the third frame of the target video.

17. The system of claim 16, wherein the adaptive CNN comprises:

a first convolution layer, linked to the pre-trained CNN and configured to transform a first feature map into a plurality of sub-feature maps, wherein the first feature map is generated by the pre-trained CNN according to any frame of the target video; and a second convolution layer, linked to the first convolution layer and configured to convolve each of the sub-feature maps with one of a plurality of adaptive convolution kernels, respectively, to output a plurality of second feature maps with improved adaptability.

18. A non-transitory computer readable storage medium for storing computer readable instructions executable by a processor to perform the method of claim 7.

* * * * *